US008626426B2

(12) United States Patent
Ohmori et al.

(10) Patent No.: US 8,626,426 B2
(45) Date of Patent: Jan. 7, 2014

(54) ENGINE AUTOMATIC STOP AND RESTART CONTROL APPARATUS

(75) Inventors: Yosuke Ohmori, Kariya (JP); Masayoshi Takeda, Kariya (JP); Tatsuya Saito, Chiryu (JP); Takashi Satoh, Okazaki (JP)

(73) Assignees: Advics Co., Ltd., Kariya (JP); DENSO CORPORATION, Kariya (JP)

( * ) Notice: Subject to any disclaimer, the term of this patent is extended or adjusted under 35 U.S.C. 154(b) by 364 days.

(21) Appl. No.: 13/185,628

(22) Filed: Jul. 19, 2011

(65) Prior Publication Data

US 2012/0022773 A1    Jan. 26, 2012

(30) Foreign Application Priority Data

Jul. 20, 2010  (JP) .................................. 2010-162787

(51) Int. Cl.
*G06F 7/70*     (2006.01)
*F02D 28/00*    (2006.01)

(52) U.S. Cl.
USPC ....................................... 701/113; 123/179.4

(58) Field of Classification Search
USPC ............. 701/84, 87, 91, 110–113; 123/179.1, 123/179.3, 179.4, 196 S, 198 D, 319, 320, 123/339.1, 339.16, 339.19, 399, 436; 477/3, 4, 183, 184, 199, 200, 203
See application file for complete search history.

(56) References Cited

U.S. PATENT DOCUMENTS

| 4,773,500 | A  | * | 9/1988 | Naito et al. ................... 180/233 |
| 4,928,652 | A  | * | 5/1990 | Shinya et al. ................. 477/111 |
| 6,688,415 | B2 | * | 2/2004 | Atkinson et al. .............. 180/233 |
| 2009/0030595 | A1 | * | 1/2009 | Sugai ............................. 701/112 |
| 2009/0037081 | A1 | * | 2/2009 | Santou et al. ................. 701/104 |
| 2010/0038158 | A1 | * | 2/2010 | Whitney et al. .......... 180/65.265 |
| 2010/0116247 | A1 | * | 5/2010 | Shikama et al. ............. 123/399 |
| 2011/0130901 | A1 | * | 6/2011 | Mori et al. ...................... 701/22 |

FOREIGN PATENT DOCUMENTS

JP    A-2000-313253    11/2000

* cited by examiner

*Primary Examiner* — John Kwon
*Assistant Examiner* — Johnny Hoang
(74) *Attorney, Agent, or Firm* — Posz Law Group, PLC

(57) ABSTRACT

An engine automatic stop and restart control apparatus is provided. The apparatus includes a control unit which stops and restarts an engine, an actual axle torque change speed calculation unit which calculates change speed in actual axle torque that is actually generated when the engine is restarted, an ideal axle torque change speed calculation unit which calculates change speed in ideal axle torque that corresponds to engine torque generated by the engine, a change speed difference calculation unit which calculates a change speed difference that is a difference between the change speed in actual axle torque and the change speed in ideal axle torque, and a vibration suppression control unit which executes a vibration suppression control for applying braking torque based on the change speed difference.

5 Claims, 12 Drawing Sheets

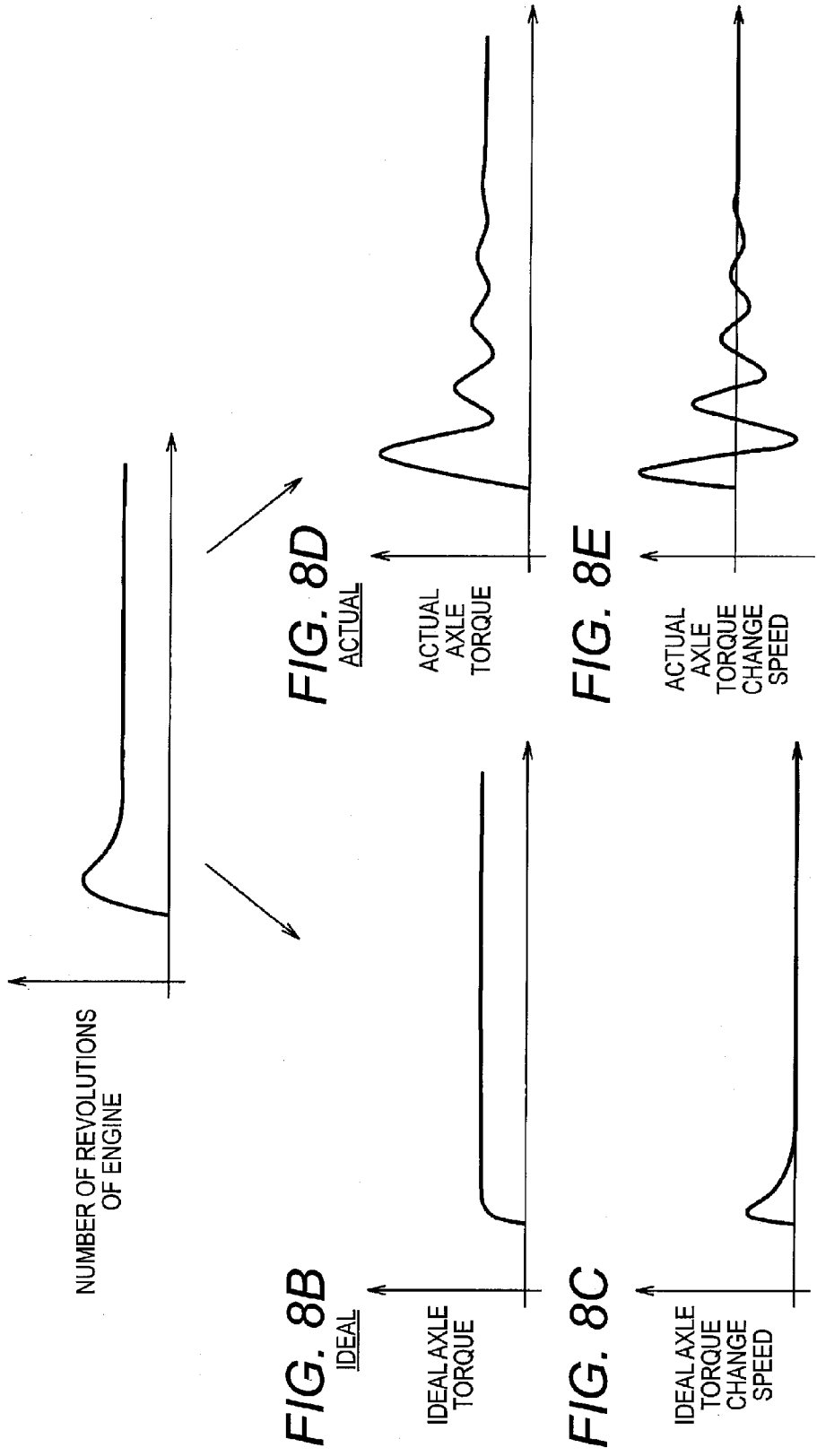

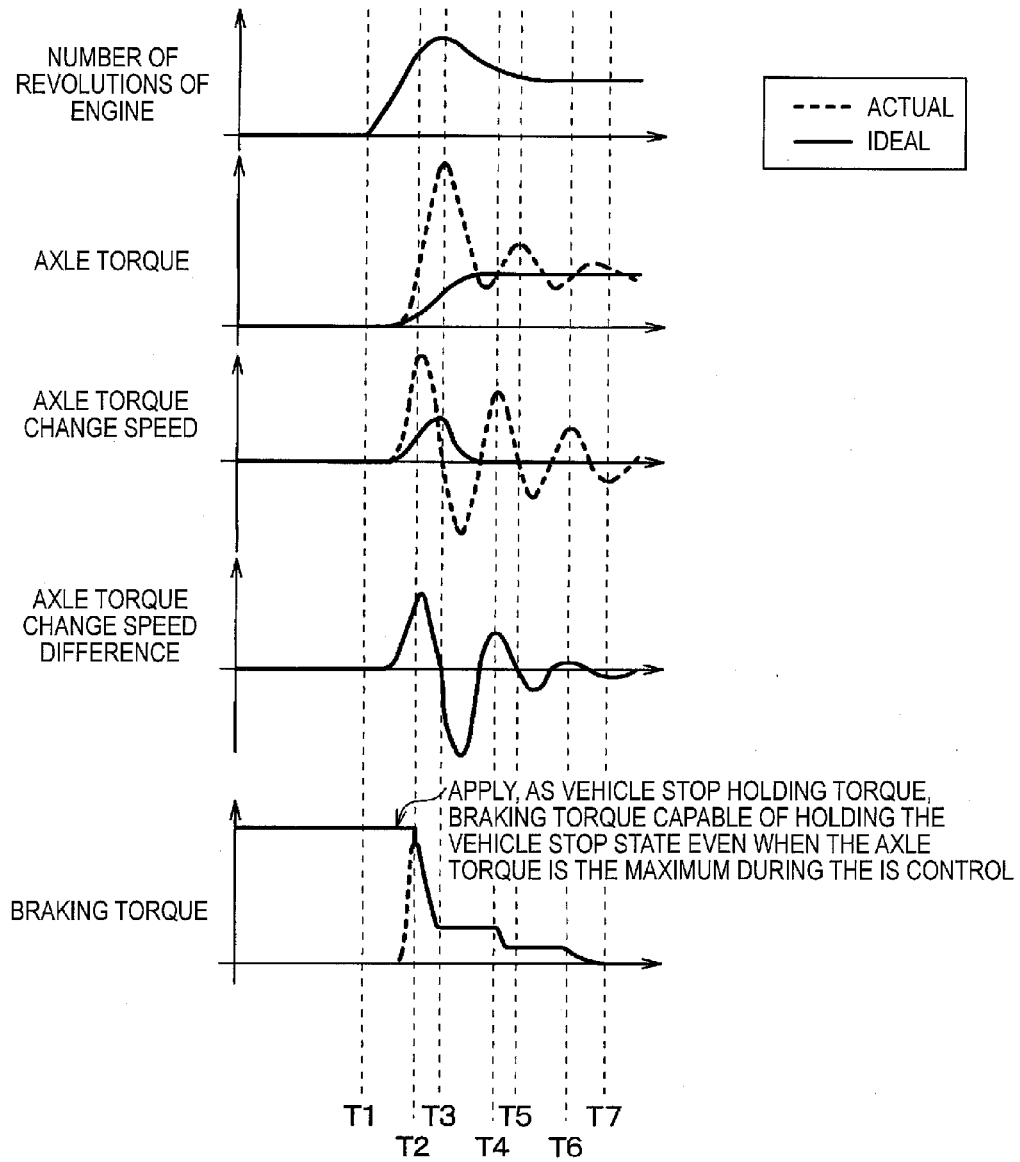

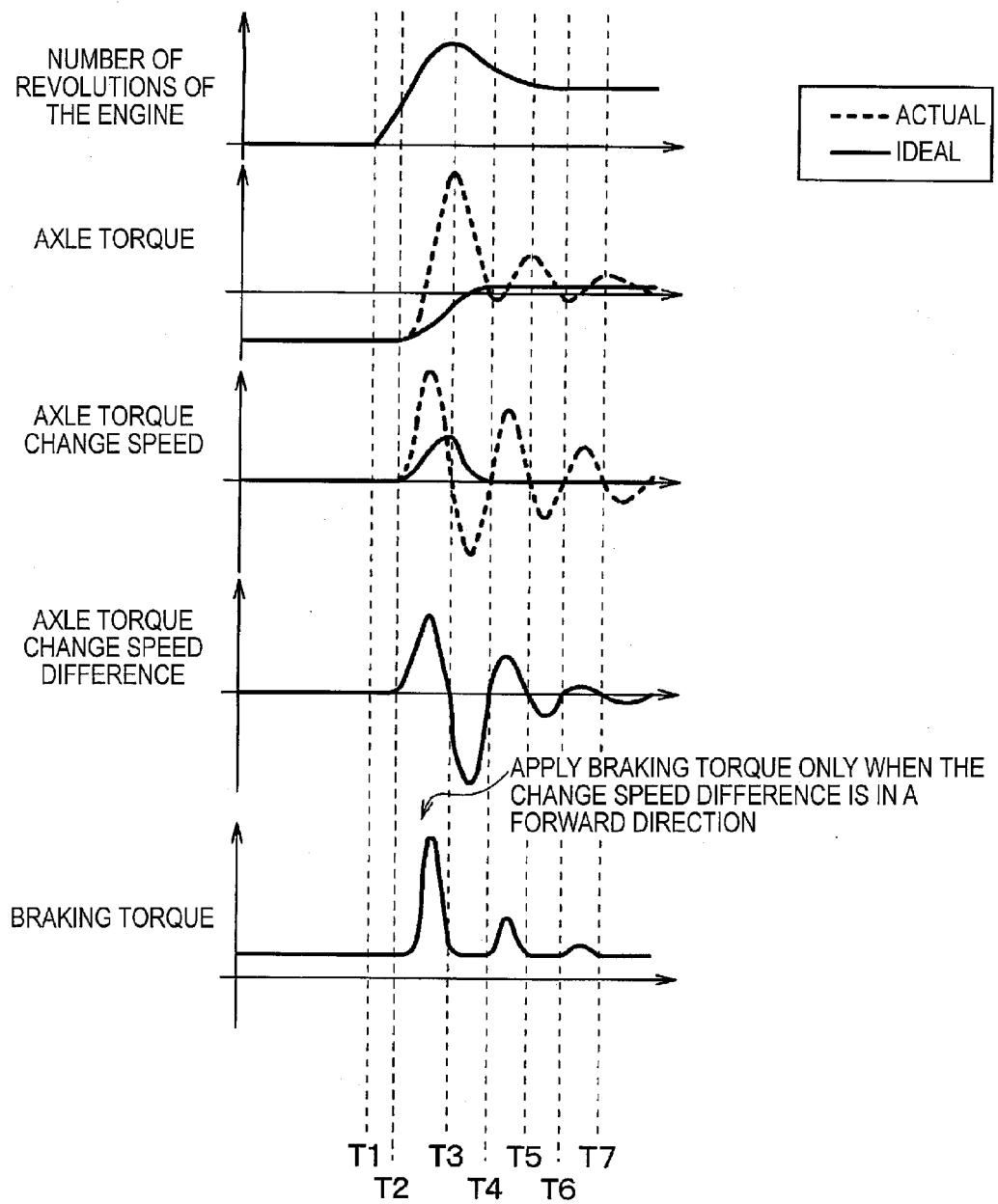

ENGINE AUTOMATIC STOP AND RESTART CONTROL APPARATUS

CROSS REFERENCE TO RELATED APPLICATIONS

This application is based on and claims priority under 35 U.S.C. §119 to Japanese Patent Application 2010-162787, filed on Jul. 20, 2010, the entire content of which is incorporated herein by reference.

BACKGROUND

1. Field of the Invention

The invention relates to an engine automatic stop and restart control apparatus that executes an idling stop control (hereinafter, referred to as IS control) of stopping an engine (internal combustion engine), which is a travel driving source, so as to perform an idling stop when a predetermined condition is satisfied.

2. Description of Related Art

JP-2000-313253A proposes a control apparatus to solve the shaking in the front-rear direction (front-rear acceleration), which is generated to a vehicle when restarting an engine. Based on instability of engine rotating speed and an engaged state of a clutch when restarting the engine, the shaking in the front-rear direction (front-rear acceleration) is generated to the vehicle. Accordingly, in the control apparatus described in JP-2000-313253A, the shaking in the front-rear direction is solved by determining a reduction timing of braking force and a method of reducing the braking force in accordance with restoring of the driving force. Specifically, when restarting the engine, a reduction starting timing of braking force is determined as a point of time at which predetermined time has elapsed from a point of time at which the engine rotating speed has reached maximum rotating speed before the engine rotating speed is stabilized into an idle rotating speed, and the reducing speed of the braking force is determined based on a magnitude of braking force for holding a vehicle stop state (vehicle stop holding braking force). Thereby, it is possible to suppress a vehicle from rapidly starting and from going back at the same time.

SUMMARY

There are needs for improvement on starting responsiveness, and therefore, when the engine restarting time is reduced, a peak of the maximum rotating speed of the engine rotating speed becomes also higher, so that a shock is correspondingly increased. According to the control method described in JP-2000-313253A, when the engine rotating speed becomes the maximum rotating speed at which the shock is maximized, the braking force is sufficiently applied, so that not only the engine torque but also the vibration torque is applied to generate vibration-like shock in a driving system, thereby vibrating the vehicle body in the front-rear direction. In other words, when the engine is early restarted with a transmission being engaged, a blow-up of the engine is increased, so that high torque is instantaneously generated, which is higher than the torque at the time of normal start. The instantaneously high torque causes resonances in a transmission, a suspension, tires and the like, which are provided in the vehicle, thereby vibrating the vehicle body in the front-rear direction.

The present invention has been made in view of the above circumstances, and it is an object of the present invention to provide an engine automatic stop and restart control apparatus capable of suppressing vibration of a vehicle body in a front-rear direction at the time of engine restart.

According to an illustrative embodiment of the present invention, there is provided an engine automatic stop and restart control apparatus comprising: an automatic stop and restart control unit which stops and restarts an engine that is a driving source of a vehicle; an actual axle torque change speed calculation unit which calculates change speed in actual axle torque that is actually generated when the engine is restarted; an ideal axle torque change speed calculation unit which calculates change speed in ideal axle torque that corresponds to engine torque generated by the engine; a change speed difference calculation unit which calculates a change speed difference that is a difference between the change speed in actual axle torque and the change speed in ideal axle torque; and a vibration suppression control unit which executes a vibration suppression control for applying braking torque based on the change speed difference.

According to the above configuration, when the engine is restarted, the vibration suppression control is executed and the braking torque is generated based on the change speed difference that is a difference between the actual axle torque change speed and the ideal axle torque change speed. Thereby, it is possible to suppress the vibration torque, which is generated when the engine is restarted, and thus the shock of a vehicle body.

BRIEF DESCRIPTION OF THE DRAWINGS

The foregoing and additional features and characteristics of this disclosure will become more apparent from the following detailed description considered with the reference to the accompanying drawings, wherein:

FIG. 8A shows a time change of the number of revolutions of an engine when the engine is restarted, FIGS. 8B and 8C show time changes of ideal axle torque and ideal axle torque change speed, which correspond to the time change of the number of revolutions of an engine, and FIGS. 8D and 8E show time changes of actual axle torque and axle torque change speed when shock suppression brake control is not executed;

FIG. 14 is a timing chart for illustrating a case where the shock suppression brake control of the pattern 1 is executed; and FIG. 15 is a timing chart for illustrating a case where the shock suppression brake control of the pattern 2 is executed.

DETAILED DESCRIPTION

Figure 1:
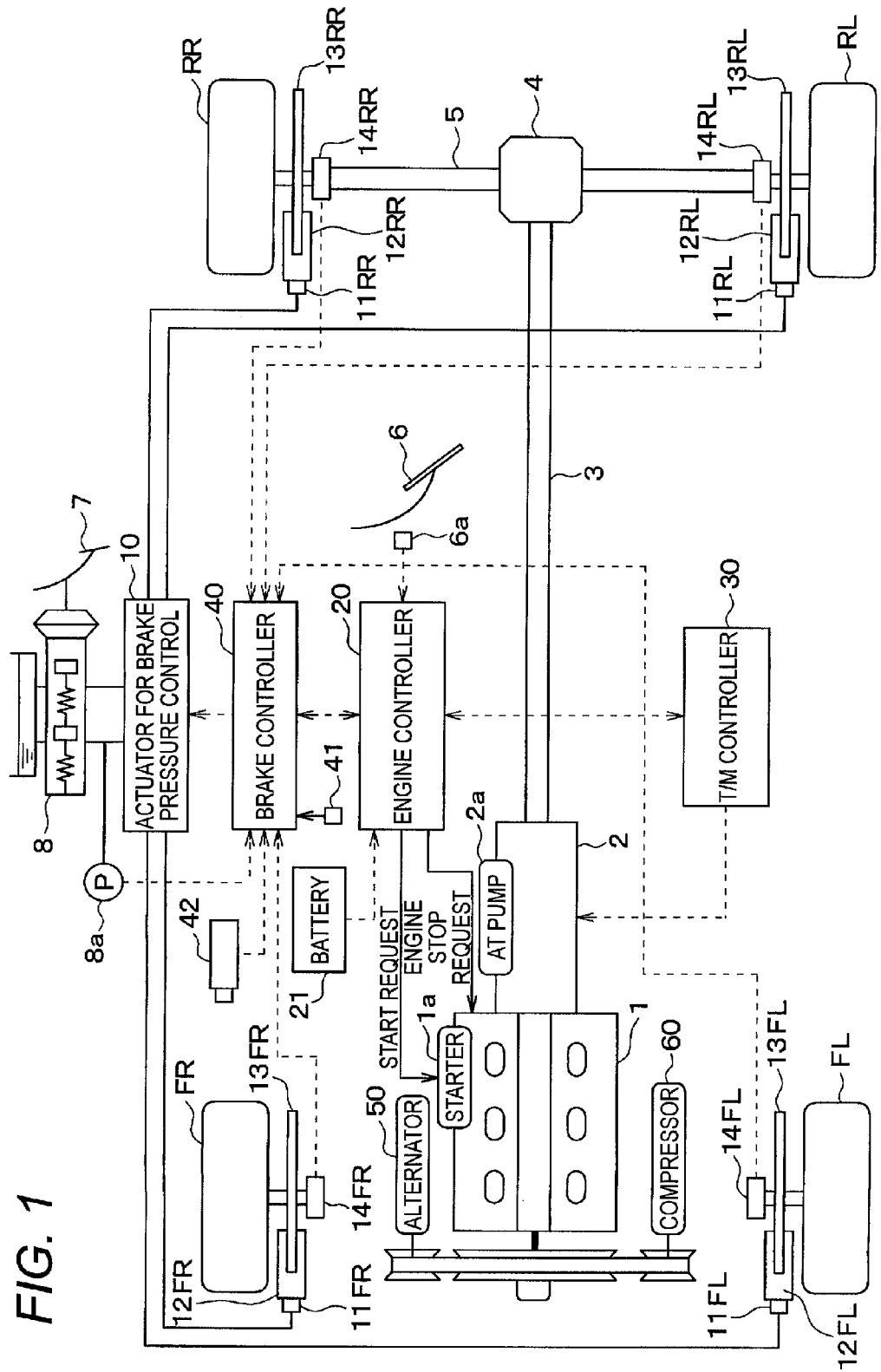
FIG. 1 is an overall configuration diagram of a vehicle control system to which an engine automatic stop and restart control apparatus executing IS control according to a first illustrative embodiment of the present invention is applied.

Hereinafter, illustrative embodiments of the present invention will be described with reference to the drawings. In the respective illustrative embodiments, the same or equivalent parts are indicated with the same reference numerals in the drawings.

First Illustrative Embodiment

A first illustrative embodiment of the present invention is described. FIG. 1 is an overall configuration diagram of a vehicle control system to which an engine automatic stop and restart control apparatus executing IS control according to this illustrative embodiment is applied. Here, a case is described in which the engine automatic stop and restart control apparatus of this illustrative embodiment is applied to an FR vehicle in which an engine 1 is mounted at the front thereof and rear wheels RR, RL are used as driving wheels. However, the present invention can be also applied to the other vehicles such as FF vehicle in which front wheels FR, FL are used as driving wheels.

As shown in FIG. 1, a driving system of the FR vehicle has an engine 1, a transmission 2, a propeller shaft 3, a differential 4 and a drive shaft 5 and applies driving force to real wheels RR, RL through the above constitutional elements. Specifically, engine power (engine torque), which is generated based on an operating amount of an accelerator pedal 6, is transmitted to the transmission 2 and is converted with a gear ratio in accordance with a gear position set to the transmission 2 and then the driving force is transmitted to the propeller shaft 3. Then, the driving force is applied to the rear wheels RR, RL through the drive shaft 5 that is connected to the propeller shaft 3 via the differential 4.

In addition, a braking system is configured by a brake system that generates brake fluid pressure in an M/C 8 in accordance with an operating amount of a brake pedal 7 and transmits the brake fluid pressure to the respective wheels FR to RL to generate braking force. The brake system is provided with an actuator 10 for brake fluid pressure control and wheel cylinders (hereinafter, referred to as W/C) 11FR, 11FL, 11RR, 11RL, calipers 12FR, 12FL, 12RR, 12RL and disc rotors 13FR, 13FL, 13RR, 13RL, which are provided to the respective wheels FR to RL. Brake fluid pressures, which are applied to the W/C 11FR to 11RL, are controlled by the actuator 10 for brake fluid pressure control, so that holding forces of the disc rotors 13FR, 13FL, 13RR, 13RL are adjusted by brake pads provided in the calipers 12FR, 12FL, 12RR, 12RL and the braking forces of the respective wheels FR to RL are thus controlled.

For example, the actuator 10 for brake fluid pressure control has a configuration including a reservoir, which accommodates therein a variety of control valves for boosting, holding and reducing the pressures of the W/C 11FR to 11RL and brake fluids in the W/C 11FR to 11RL when reducing the pressures, a pump, which returns the brake fluids received in the reservoir to the M/C 8, a motor, which drives the pump, and the like. By the configuration, the M/C 8 and the W/C 11FR to 11RL are connected therebetween at the normal brake, so that the braking forces are generated to the respective wheels FR to FL in accordance with the operating amount (stroke amount or pedaling force) of the brake pedal 7. When slip ratios of the respective wheels FR to FL exceed an ABS control starting threshold, the ABS control is initiated to control the W/C pressures, thereby avoiding lock tendency. Specifically, when executing the ABS control, the various control valves are driven and the motor is driven to operate the pump, so that the W/C pressures are boosted, held or reduced to control the slip ratios of the respective wheels FR to FL into desired slip ratios, thereby avoiding the lock tendency.

In this system, an engine controller (hereinafter, referred to as engine ECU) 20 for controlling the driving system, a transmission controller (hereinafter, referred to as T/M-ECU) 30 and a brake controller (hereinafter, referred to as brake ECU) 40 for controlling the brake system are also provided.

The engine ECU 20 is to basically execute the control on the engine 1. However, in this illustrative embodiment, the engine ECU 20 also functions as a part that executes the IS control. In this illustrative embodiment, the engine ECU 20 and the brake ECU 40 are integrated to configure an engine automatic stop and restart control apparatus.

The engine ECU 20 is configured by a known microprocessor having a CPU, a ROM, a RAM, an I/O and the like, and executes a variety of calculations and processes in accordance with programs stored in the ROM and the like, thereby controlling the engine output (engine torque) to control the driving forces to be generated to the rear wheels RR, RL. For example, the engine ECU 20 is input with the operating amount of the accelerator pedal 6 by a detection signal of a pedal sensor 6a, and adjusts a fuel injection apparatus, based on the operating amount of the accelerator pedal 6, thereby adjusting a fuel injection amount. Accordingly, the engine output is controlled and the driving force is thus adjusted. In this illustrative embodiment, the engine ECU 20 also performs the IS control, and outputs an engine stop request to the engine 1 and an engine start request to a starter 1a. The engine stop request and the engine start request are output when various conditions are satisfied. The various conditions will be described in the below.

The engine ECU 20 is input with a start request of an AT pump 2a (hereinafter, referred to as AT pump start request) from the T/M-ECU 30 and brake/vehicle speed information from the brake ECU 40. The AT pump 2a is to drive the transmission 2 that is driven in accordance with the driving of the engine 1. When driving the AT pump 2a, it is necessary to drive the engine 1. Accordingly, by outputting the AT pump start request to the engine ECU 20 from the T/M-ECU 30, the start request of the engine 1 is output through the engine ECU 20. In addition, as the conditions for outputting the engine stop request in the IS control, a brake pressure, information indicating whether the ABS control is being performed, and vehicle speed are used, as described below. Thus, by transmitting the brake pressure or information indicating whether the ABS control is being performed to the engine ECU 20 from the brake ECU 40, as the brake information, and the vehicle speed information, it is possible to use the same in the IS control.

Furthermore, the engine ECU 20 is input with information about a voltage of a battery 21 (battery voltage). Since the battery voltage is also used as the conditions for outputting the engine start request in the IS control, the battery voltage is input to the engine ECU 20 and is thus used for the IS control.

The T/M-ECU 30 is configured by a known microprocessor having a CPU, a ROM, a RAM, an I/O and the like, and executes a variety of calculations and processes in accordance with programs stored in the ROM and the like, thereby selecting the gear position of the transmission 2, and the like. The T/M-ECU 30 exchanges the information with the engine ECU 20 and transmits the gear position of the transmission 2 to the engine ECU 20. Accordingly, the engine ECU 20 calculates the engine output, considering the gear position of the transmission 2 included in the information transmitted from the T/M-ECU 30 as well as the operating amount of the accelerator pedal 6. In addition, the T/M-ECU 30 outputs the AT pump start request when driving the AT pump 2a and transmits the same to the engine ECU 20.

The brake ECU 40 is configured by a known microprocessor having a CPU, a ROM, a RAM, an I/O and the like, and executes a variety of calculations and processes in accordance with programs stored in the ROM and the like, thereby generating arbitrary braking forces to the respective wheels FR to FL.

The brake ECU 40 executes a variety of calculations, based on detection signals of various sensors. For example, the brake ECU detects the M/C pressure in the M/C 8, which is generated in accordance with the operating amount of the brake pedal 7, by a pressure sensor 8a and differentiates the same with respect to time, thereby calculating brake pressure change speed. In addition, the brake ECU 40 is input with a detection signal of a front-rear acceleration (hereinafter, referred to as front-rear G) sensor 41 and calculates vehicle deceleration, based on the detection signal of the front-rear G sensor 41. Also, the brake ECU 40 distinguishes temperatures on a road and a road surface type (asphalt road surface, concrete road surface, snow-accumulated road, frozen road and the like), based on an image taken by a vehicle-mounted camera 42, by the known methods, thereby detecting a road surface $\mu$. Further, the brake ECU 40 receives detections signals from wheel speed sensors 14FR, 14FL, 14RR, 14RL, which are provided to the respective wheels FR to FL, to calculate the respective wheel speeds, calculates estimated vehicle body speed (hereinafter, referred to as vehicle speed), based on the calculated wheel speeds, by the known methods, and calculates slip ratios of the respective wheels FR to RL by dividing differences between the vehicle speed and the respective wheel speeds by the vehicle speed. When any slip ratio exceeds an ABS control starting threshold, the brake ECU 40 outputs a control signal to the actuator 10 for brake fluid pressure control, thereby controlling the W/C pressure, which is generated to the W/C 11FR to 11RL of a wheel to be controlled, and thus avoiding lock tendency.

Although not specifically shown, the engine ECU 20 is input with start requests from various ECUs, as the other start requests than the brake pressure, in addition to the AT pump start request. In other words, when using an apparatus that is driven by the engine 1, the engine 1 should be restarted. Accordingly, the start request from an ECU that controls such apparatus is input to the engine ECU 20. For example, as shown in FIG. 1, an alternator 50 that is driven so as to charge the battery 21 and a compressor 60 that is driven so as to use an air conditioner are also driven by the engine 1. Accordingly, when driving the same, the engine 1 should be restarted. Hence, a start request is output from a power supply ECU that controls the alternator 50 or an air conditioner ECU that controls the air conditioner, so that the start request having a reason except for the brake pressure is input to the engine ECU 20.

By the above configuration, the vehicle control system having the engine automatic stop and restart control apparatus executing the IS control is configured. Next, the IS control that is executed by the vehicle control system of this illustrative embodiment is described with reference to the drawings.

Figure 2:
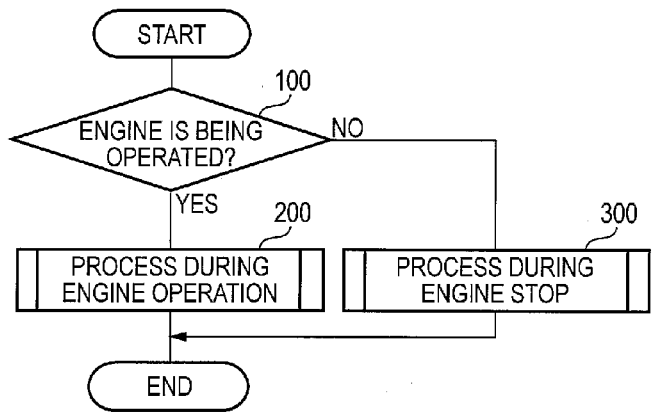
FIG. 2 is a flowchart of an IS control process that is executed by an engine ECU 20.

FIG. 2 is a flowchart of an IS control process that is executed by the engine ECU 20 functioning as the engine automatic stop and restart control apparatus of this illustrative embodiment. The process shown in FIG. 2 is executed every predetermined control period when an ignition switch (not shown) is turned on.

First, in step 100, the engine ECU 20 determines whether the engine is being operated. While the ignition switch is on, the engine ECU 20 outputs an engine stop request to stop the engine 1 and the engine 1 is thus stopped if a start request is then not output to restart the engine 1. In addition, when the number of revolutions of the engine 1 is the predetermined number of revolutions or greater, which is supposed when the engine is idling, it is considered that the engine 1 is being operated. Since the engine ECU 20 itself handles such information, the engine ECU 20 can determine whether the engine is being operated, based on any one of the information.

When a result of the determination in step 100 is positive, the engine ECU 20 proceeds to step 200 and executes a process during engine operation. On the other hand, when a result of the determination in step 200 is negative, the engine ECU 20 proceeds to step 300 and executes a process during engine stop.

Figure 3:
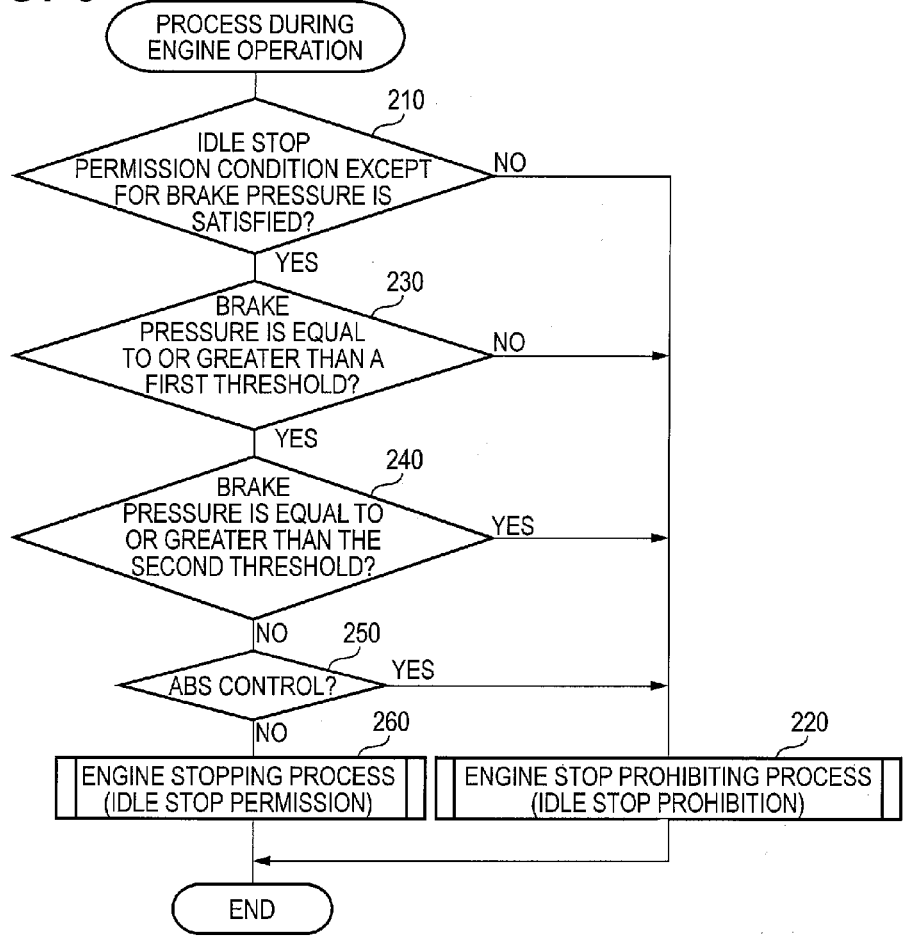
FIG. 3 is a flowchart showing a process during engine operation of FIG. 2.

FIG. 3 is a flowchart showing a process during engine operation. In the below, the process during the engine operation is described with reference to FIG. 3.

First, in step 210, the engine ECU 20 determines whether an idle stop permission condition except for the brake pressure is satisfied. The idle stop permission condition except for the brake pressure is a condition that is set as a condition for permitting an idle stop, and may include a condition that the accelerator should be off and the vehicle speed should be predetermined speed (for example, 10 km/h) or less, a condition that a battery voltage should be secured (a battery voltage is a threshold or higher), and the like, for example.

The condition that the accelerator should be off and the vehicle speed should be predetermined speed or less indicates that a driver has a mind to stop the vehicle. The state that the accelerator is off is detected, based on the detection signal of the pedal sensor 6a that detects the operating amount of the accelerator pedal 6. The vehicle speed is transmitted from the brake ECU 40. The idle stop is executed so as to improve fuel efficiency when the driver stops the vehicle. It is not preferable to execute the idle stop when there is a possibility that the vehicle will travel without stopping. Accordingly, the condition that the accelerator should be off and the vehicle speed should be predetermined speed or less is set as the condition for permitting an idle stop.

In addition, the condition that the battery voltage should be secured indicates that it is not a state that the engine ECU 20 restarts the engine 1 so as to restore the voltage at the time of the idle stop. In other words, when the battery voltage is lowered, there is a possibility that a start request will be output so as to drive the alternator 50 and the engine 1 will be thus restarted. In this case, since there is a possibility that controllability on the ABS control will not be secured, it is conditioned that the battery voltage should be secured. In the meantime, regarding the voltage lowering of the battery 21, it is possible to determine whether the battery voltage is secured by determining whether the voltage of the battery 21 is a predetermined threshold or higher.

Here, when a result of the determination is negative, it means that it is not a timing of executing the idle stop. Accordingly, the engine ECU 20 proceeds to step 220 and executes an engine stop prohibiting process of prohibiting the idle stop, thereby ending the process in this control period. Hence, when there is a possibility that the vehicle will travel without stopping, for example when the accelerator is on or when the vehicle speed exceeds the predetermined speed, the idle stop is prohibited. In addition, even when the battery voltage is not secured, the idle stop is prohibited, and even when the engine 1 is restarted based on the condition except for the brake pressure during the idle stop, the idle stop is prohibited.

On the other hand, when a result of the determination in step 210 is positive, the engine ECU 20 proceeds to step 230 and determines whether the brake pressure is a first threshold or greater. The first threshold is a threshold for permitting the idle stop, is a brake pressure at which the vehicle is decelerated and is set as a brake pressure at which it is supposed that a driver has a mind to pedal a brake. The brake pressure that is described here indicates the W/C pressure. However, the M/C pressure may be used as the brake pressure when the ABS control is not executed. Since the actuator 10 for brake pressure control is provided with the pressure sensor 8*a*, the brake ECU 40 can calculate the M/C pressure, based on a detection signal of the pressure sensor. The calculation result is transmitted to the engine ECU 20 from the brake ECU 40, so that the M/C pressure is transmitted to the engine ECU 20. In the meantime, although the W/C pressure itself is not detected in this illustrative embodiment, each W/C pressure can be detected by pressure sensors that are provided to the respective W/C 11FR to 11RL.

Here, when a result of the determination is positive, the engine ECU 20 proceeds to step 240 and when a result of the determination is negative, the engine ECU 20 proceeds to step 220 and executes the engine stop prohibiting process and thus ends this process.

In step 240, the engine ECU 20 determines whether the brake pressure is a second threshold or greater. The second threshold is set as a brake pressure greater than the first threshold, at which there is a possibility that although the idle stop permission condition is satisfied, if the idle stop is executed, the controllability on the ABS control will not be able to be secured due to the battery voltage lowering when the engine 1 is restarted by any start request thereafter. For example, under circumstances in which a brake pressure equal to or greater than the second threshold is generated, the idle stop may be executed and the ABS control may be then initiated. In this case, when the battery voltage is lowered as the engine 1 is restarted, the excessive pump load resulting from the applying of the high brake pressure influences the operation of the motor for ABS control, so that it is not possible to secure the controllability on the ABS control. Accordingly, in this case, the engine ECU 20 proceeds to step 220 and executes the above engine stop prohibiting process to end the process.

In step 250, the engine ECU 20 determines whether the ABS control is being executed. The engine ECU 20 determines whether the ABS control is being executed, based on information indicating whether the ABS control is being executed, which is included in the brake information transmitted from the brake ECU 40. For example, when the condition of initiating the ABS control is satisfied, the brake ECU 40 sets an ABS control flag until the vehicle is stopped or the brake operation is released. When the ABS control flag is set, the information indicating that the ABS control is being executed is transmitted to the engine ECU 20. When the ABS control flag is reset, information indicating that the ABS control is not executed is transmitted to the engine ECU 20.

When any start request is output and the engine 1 is thus restarted during the ABS control, the ABS control being executed may not be executed with good controllability. Accordingly, it is preferable that the ABS control is preferentially executed, rather than the idle stop, during the ABS control. Thus, when a result of the determination in step 250 is positive, the engine ECU 20 proceeds to step 220 and prohibits the idle stop. On the other hand, when a result of the determination in step 250 is negative, the engine ECU 20 proceeds to step 260. That is, when it is determined that the ABS control is being executed, the idle stop is prohibited, and after the ABS control is ended, the idle stop is again permitted.

In step 260, the engine ECU 20 permits the idle stop. When the idle stop is permitted, the engine stop request is output from the engine ECU 20, so that the engine 1 is stopped. Accordingly, since the fuel injection amount becomes zero by the adjustment of the fuel injection apparatus, it is possible to increase the fuel efficiency. In addition, the engine ECU 20 executes the engine stopping process.

Figure 4:
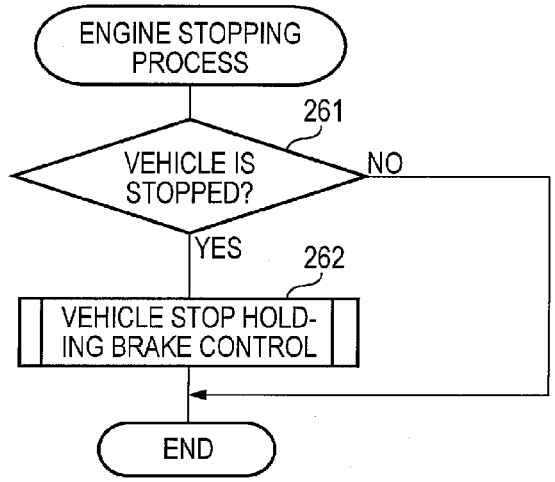
FIG. 4 is a flowchart showing an engine stopping process of FIG. 2.

FIG. 4 is a flowchart showing the engine stopping process. The engine stopping process is described with reference to FIG. 4.

First, in step 261, the engine ECU 20 determines whether the vehicle is stopped. The engine ECU 20 may perform the determination by determining whether the vehicle speed is zero, for example. Since the engine ECU 20 is input with the vehicle speed information from the brake ECU 40, the engine ECU 20 can perform the determination, based on the vehicle speed information. When it is determined that the vehicle is stopped, the engine ECU 20 proceeds to step 262. On the other hand, when it is not determined that the vehicle is stopped, the engine ECU 20 ends this process.

In step 262, the engine ECU 20 executes a vehicle stop holding brake control process. In the vehicle stop holding brake control process, the engine ECU 20 basically executes a process for generating braking torque that is required to hold the vehicle stop state.

Figure 5:
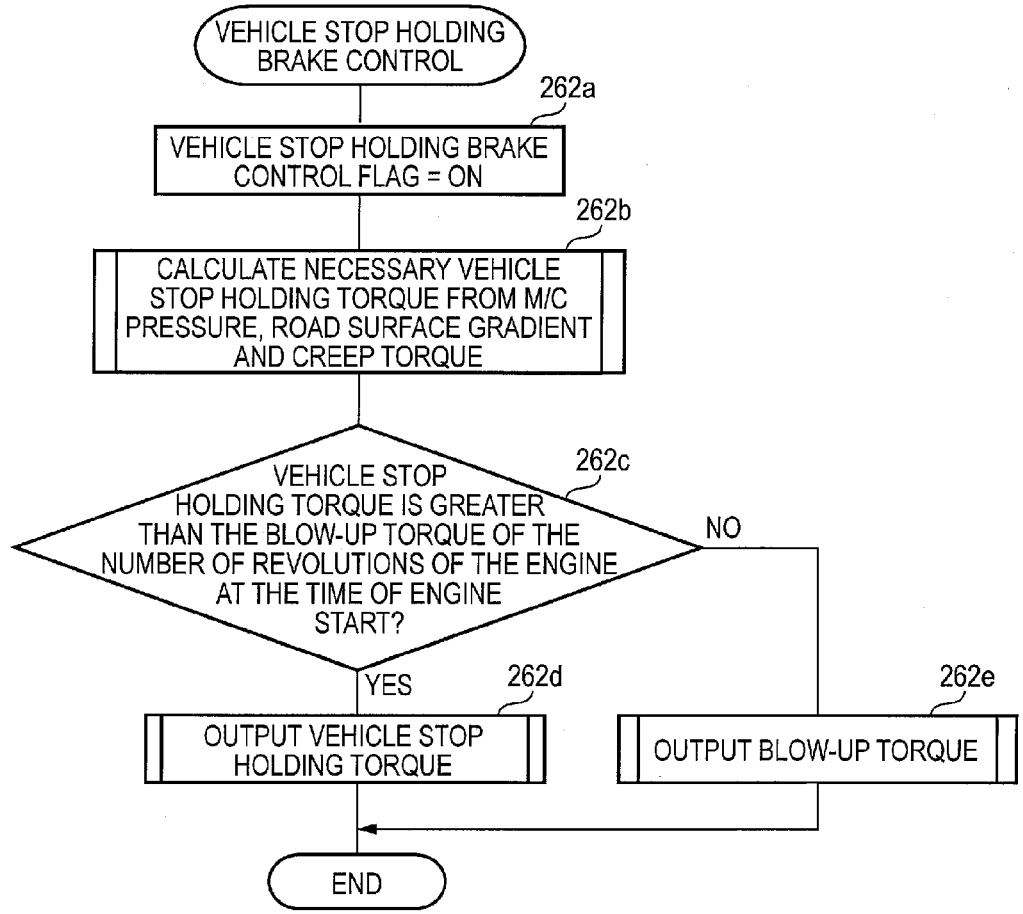
FIG. 5 is a flowchart showing a vehicle stop holding brake control process of FIG. 4.

FIG. 5 is a flowchart showing the vehicle stop holding brake control process in details. The vehicle stop holding brake control process is described with reference to FIG. 5.

First, in step 262*a*, the engine ECU 20 sets a vehicle stop holding brake control flag (not shown) ON, which is provided to the engine ECU 20, and stores that the vehicle stop holding brake control is being executed. Then, the engine ECU 20 proceeds to step 262*b* and calculates vehicle stop holding torque corresponding to the braking torque that is required to hold the vehicle stop state, based on the M/C pressure, a road surface gradient and creep torque. Regarding the M/C pressure, the detection result of the pressure sensor 8*a* is used. In the meantime, since the gravity acceleration component is included in the detection signal of the front-rear G sensor 41, the road surface gradient is calculated by the known method, from the detection signal of the front-rear acceleration sensor at the vehicle stop state. Regarding the creep torque, the engine torque is used because the creep torque is the engine torque at the creep traveling, which is handled by the engine ECU 20. Based on the above information, the torque attributing to the backward moving direction of the vehicle is subtracted from the torque attributing to the forward moving direction of the vehicle and the braking torque, which can hold the vehicle stop state while suppressing a difference thereof, is set as the vehicle stop holding torque.

In step 262c, the engine ECU 20 determines whether the vehicle stop holding torque is greater than blow-up torque of the number of revolutions of the engine at the time of the engine start. The blow-up torque may be calculated in advance by tests and the like. Accordingly, as a result of the comparison of the vehicle stop holding torque, which is calculated in step 262b, and the blow-up torque, when the vehicle stop holding torque is greater than the blow-up torque, the engine ECU 20 proceeds to step 262d, and when the blow-up torque is greater than the vehicle stop holding torque, the engine ECU 20 proceeds to step 262e.

In step 262d, the engine ECU 20 outputs the vehicle stop holding torque, thereby ending this process. In step 262e, the engine ECU 20 outputs the blow-up torque, thereby ending this process. In other words, when the blow-up torque is greater than the vehicle stop holding torque, it means that the vehicle stop holding torque is below the braking torque required to suppress shock of the vehicle body at the time of the engine restart, which is desired to be suppressed during a shock suppression brake control (which corresponds to a vibration suppression control) that will be described in the below. Accordingly, in step 262e, in order to satisfy the braking torque necessary to suppress the shock of the vehicle body at the time of the engine restart, in correspondence to the blow-up torque of the number of revolutions of the engine, the blow-up torque is set as the braking torque. Thereby, it is possible to generate the braking torque having a magnitude that can sufficiently suppress the shock of the vehicle body at the time of the engine restart.

Figure 6:
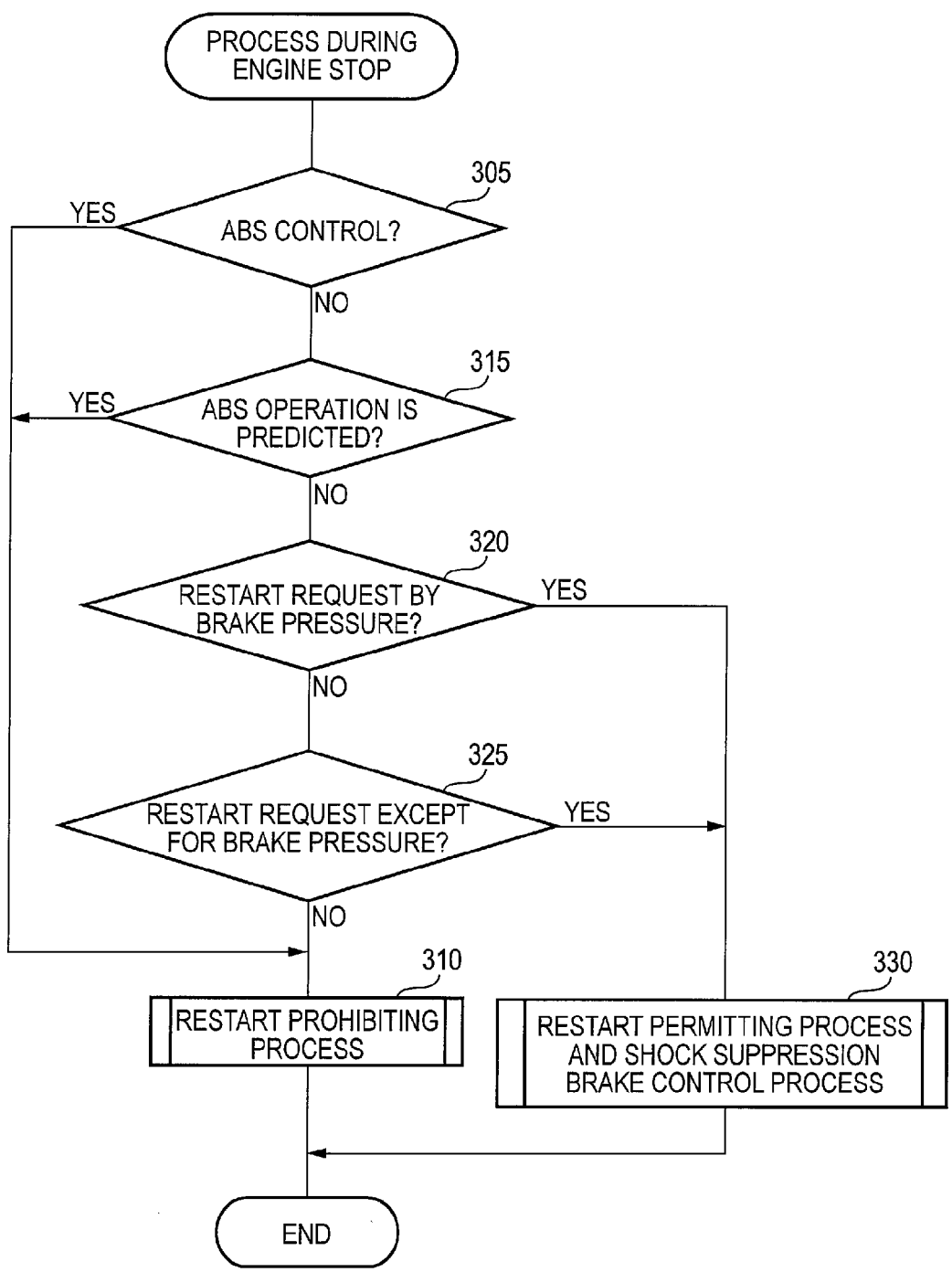
FIG. 6 is a flowchart showing a process during engine stop of FIG. 2.

Next, the process during engine stop in step 300 of FIG. 2 is described. FIG. 6 is a flowchart showing the process during engine stop. The process during engine stop is described with reference to FIG. 6.

First, in step 305, the engine ECU 20 determines whether the ABS control is being executed. The determination is made in the same manner as step 250 of FIG. 3. When a result of the determination is positive, the engine ECU 20 proceeds to step 310 and executes a restart prohibiting process so as to suppress the controllability on the ABS control from worsening. In other words, there is a possibility that the battery voltage is lowered due to the restart of the engine 1, the operation of the motor for ABS control is thus influenced and the controllability on the ABS control cannot be secured. Accordingly, during the ABS control, the engine ECU 20 executes the restart prohibiting process, thereby disabling the engine 1 from restarting.

On the other hand, when a result of the determination in step 305 is negative, the engine ECU 20 proceeds to step 315 and determines whether there is an ABS operation prediction. This determination is made, based on an ABS operation prediction determining process of predicting that the ABS control, which is executed in a separate flow (not shown), will be executed. In the ABS operation prediction determining process, when the vehicle speed is ABS initiation permitting vehicle speed, the engine ECU 20 determines whether the slip ratio is a threshold slip ratio or greater, whether the wheel deceleration is first threshold deceleration or greater, whether the brake pressure change speed is threshold change speed or greater, whether the vehicle body deceleration is second threshold deceleration or greater, whether the road surface μ is a threshold μ value or greater, and the like. When any one of them is satisfied, it is determined that there is an ABS operation prediction. Here, when it is determined that there is an ABS operation prediction, the engine ECU 20 proceeds to step 310, and when it is determined that there is no ABS operation prediction, the engine ECU 20 proceeds to step 320.

In step 320, the engine ECU 20 determines whether the restart condition by the brake pressure is satisfied. The restart condition by the brake pressure means that the driver releases the brake pedal 7 or that the brake pressure is lowered in such a level that the brake pedal 7 is loosened until it is supposed that the driver has no mind to brake the vehicle. Specifically, when the brake pressure is a release threshold or less, which is smaller than the first and second thresholds, the restart condition by the brake pressure is satisfied, and the above determination is thus made.

When a result of the determination in step 320 is positive, it is supposed that the brake is released, and the vehicle may start without executing the ABS control. Accordingly, the engine ECU 20 proceeds to step 330 and executes a restart permitting process and a shock suppression brake control process. On the other hand, when a result of the determination in step 320 is negative, the engine ECU 20 proceeds to step 325 and determines whether there is a restart request except for the brake pressure. The restart request except for the brake pressure means a start request such as AT pump start request. When there is a restart request except for the brake pressure, the engine ECU 20 also proceeds to step 330 and outputs a start request to the starter 1a to permit the engine restart, thereby executing a restart permitting process. In addition, the engine ECU 20 executes the shock suppression brake control process together with the restart permitting process.

Figure 7:
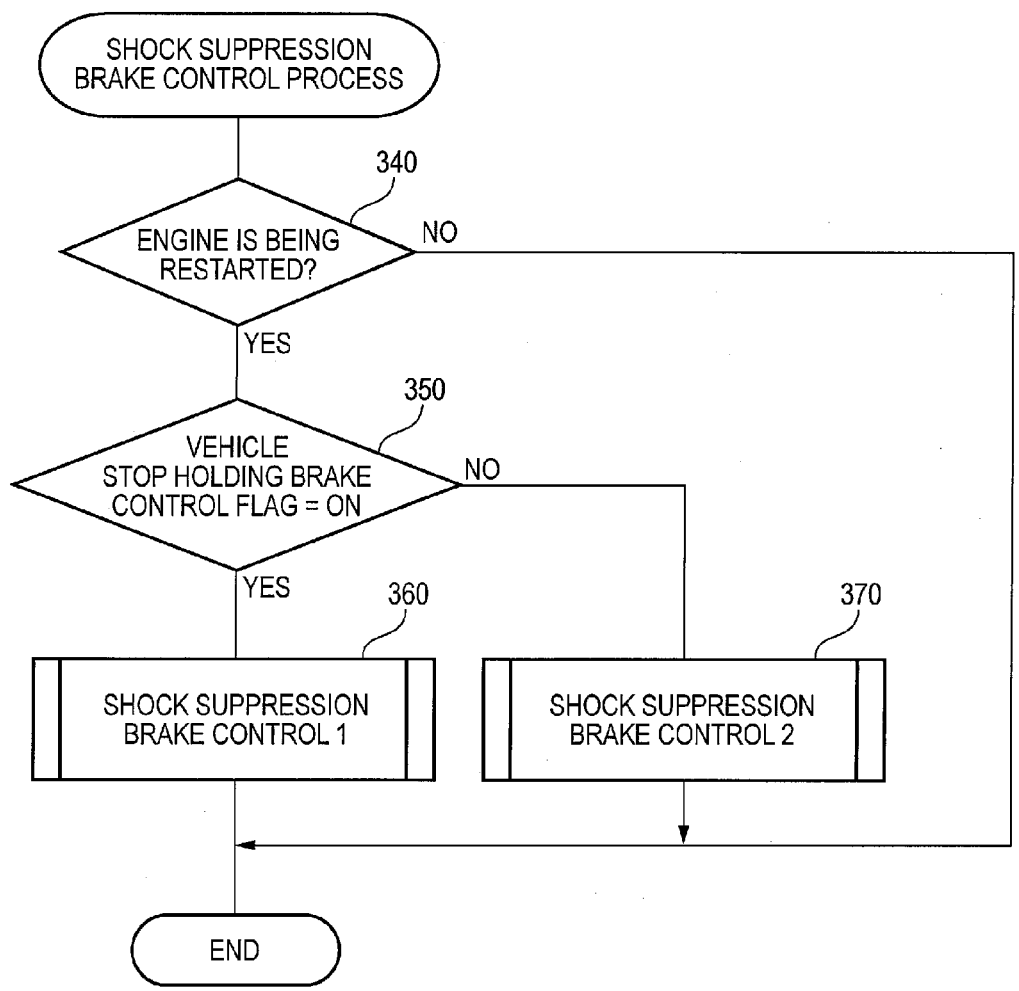
FIG. 7 is a flowchart showing details of a shock suppression brake control process.

FIG. 7 is a flowchart showing details of the shock suppression brake control process. The shock suppression brake control process is described with reference to FIG. 7.

First, in step 340, the engine ECU 20 determines whether the engine is being restarted. During a predetermined time period after outputting the start request to the starter 1a, there is a possibility that shock, which vibrates the vehicle body in the front-rear direction so as to restart the engine, will be generated. Therefore, the engine ECU 20 is adapted to detect that the engine is being restarted and to execute the shock suppression brake control at that time. The engine ECU 20 determines whether the engine is being restarted, based on a flag indicating that the engine is restarted or the number of revolutions of the engine. The flag indicating that the engine is restarted is set when the engine restart is permitted in step 330 of FIG. 6 and is reset when the number of revolutions of the engine reaches a peak value, which is supposed at the time of blow-up, after the engine restart is permitted. When the flag is set and the number of revolutions of the engine is a threshold or less, which is smaller than the number of idle revolutions, which is supposed when the engine is restarted, it is determined that the engine is being restarted. When a result of the determination is negative, since there is no possibility that the shock will be generated to the vehicle body, the engine ECU 20 ends this process. On the other hand, when a result of the determination is positive, the engine ECU 20 proceeds to step 350.

In step 350, the engine ECU 20 determines whether the vehicle stop holding brake control is being executed by determining whether a stop holding brake control flag is ON. When a result of the determination is positive, the engine ECU 20 proceeds to step 360 and executes a control process of a pattern 1 of the shock suppression brake control. On the other hand, when a result of the determination is negative, the engine ECU 20 proceeds to step 370 and executes a control process of a pattern 2 of the shock suppression brake control. Here, regarding the patterns of the shock suppression control brake control, the patterns 1 and 2 are provided. The pattern 1 indicates the shock suppression brake control during the vehicle stop and the pattern 2 indicates the shock suppression brake control at a state in which the vehicle is not stopped. In other words, during the vehicle stop, since the vehicle stop holding torque (or blow-up torque) has been already set as the braking torque, the control for shock suppression is executed at that state. At a state in which the vehicle is not stopped, since there is a possibility that the braking torque corresponding to the brake operation will be generated but the determined braking torque is not set, the control for shock suppression is executed at that state.

Here, before specifically describing the shock suppression brake control in details, the concept about the shock suppression method of the vehicle body by the shock suppression brake control is described.

FIG. 8A shows a time change of the number of revolutions of the engine when the engine is restarted, FIGS. 8B and 8C show time changes of ideal axle torque and ideal axle torque change speed, which correspond to the time change of the number of revolutions of the engine, and FIGS. 8D and 8E show time changes of actual axle torque and actual axle torque change speed when the shock suppression brake control is not executed.

When restarting the engine, as shown in FIG. 8A, the number of revolutions of the engine is highly increased at the restart moment and then is gradually stabilized to the number of idle revolutions. Compared to this, it is ideal to change the axle torque more gently than the number of revolutions of the engine, as shown in FIG. 8B, and to generate the axle torque change speed only at the restart moment, as shown in FIG. 8C, because it is possible to rapidly set the axle torque with the creep torque while suppressing a feeling of the sudden start.

However, as shown in FIGS. 8D and 8E, since vibration torque (resonance) is actually generated in addition to the engine torque accompanied by the engine restart, the actual axle torque and the actual axle torque change speed form amplitude waveforms. This indicates that the shock is generated to the vehicle body.

That is, the shock is generated to the vehicle body due to a difference between the ideal axle torque or ideal axle torque change speed and the actual axle torque or actual axle torque change speed. Accordingly, by suppressing the vibration torque, based on the difference between the ideal axle torque change speed and the actual axle torque change speed, it is possible to suppress the amplitude of the actual axle torque and to thus make the actual axle torque close to the ideal axle torque, thereby suppressing the shock of the vehicle.

Figure 9A:
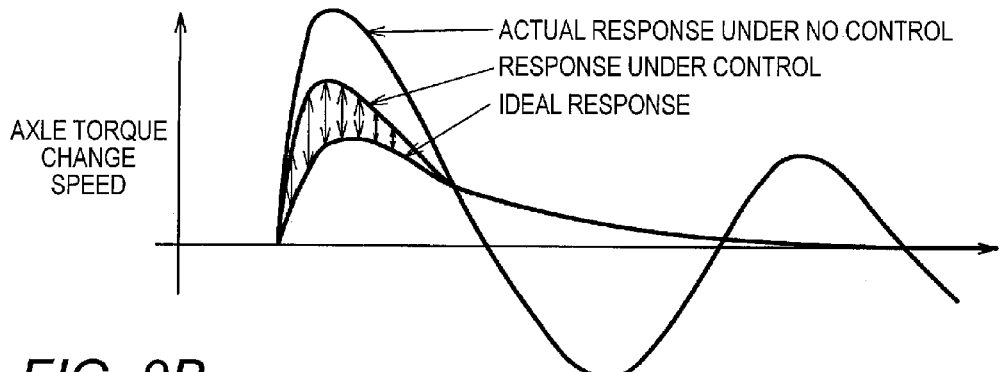
FIG. 9A shows a relation between axle torque change speed and ideal axle torque change speed when shock suppression brake control is not executed and axle torque change speed after the shock suppression brake control is executed based on a difference of the speeds.
Figure 9B:
FIG. 9B shows an example of braking torque under the shock suppression brake control.
Figure 9C:
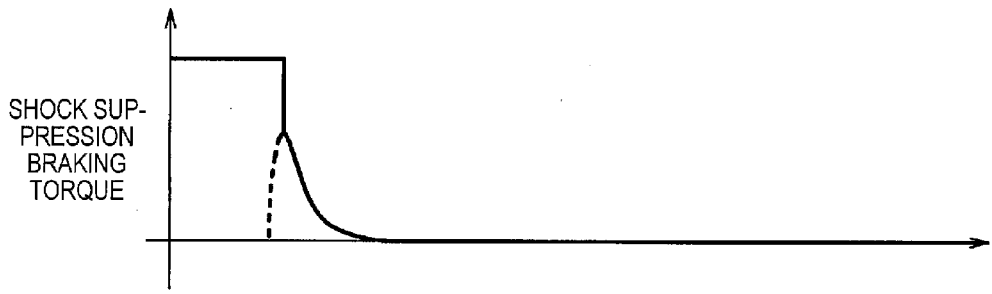
FIG. 9C shows an example of braking torque under the shock suppression brake control during vehicle stop.

FIG. 9A shows a relation between the axle torque change speed and the ideal axle torque change speed when the shock suppression brake control is not executed and the axle torque change speed after the shock suppression brake control is executed based on a difference of the speeds. Also, FIG. 9B shows an example of braking torque under the shock suppression brake control, and FIG. 9C shows an example of braking torque under the shock suppression brake control during vehicle stop.

As shown in FIG. 9A, a difference is caused between the axle torque change speed and the ideal axle torque change speed. Accordingly, the ideal axle torque change speed is obtained, as a reference model, based on a preset vehicle model, the braking torque for suppressing the vibration torque (hereinafter, referred to as shock suppression braking torque), which is shown in FIG. 9B, is continuously determined based on the difference between the actual axle torque change speed and the ideal axle torque change speed, and the shock suppression braking torque is applied, so that the axle torque after the control can be made to be close to the ideal axle torque. In addition, when the vehicle is stopped at the time of the engine restart, the vehicle stop holding torque (or blow-up torque) has been already generated as the braking torque. Accordingly, as shown in FIG. 9C, when the braking torque, which has been already generated, and the shock suppression braking torque are overlapped to reduce the braking torque from the peak of the shock suppression braking torque, it is possible to suppress the shock in correspondence to the vehicle stop state. Based on this method, it is possible to execute the shock suppression brake control process, thereby suppressing the shock of the vehicle.

Figure 10:
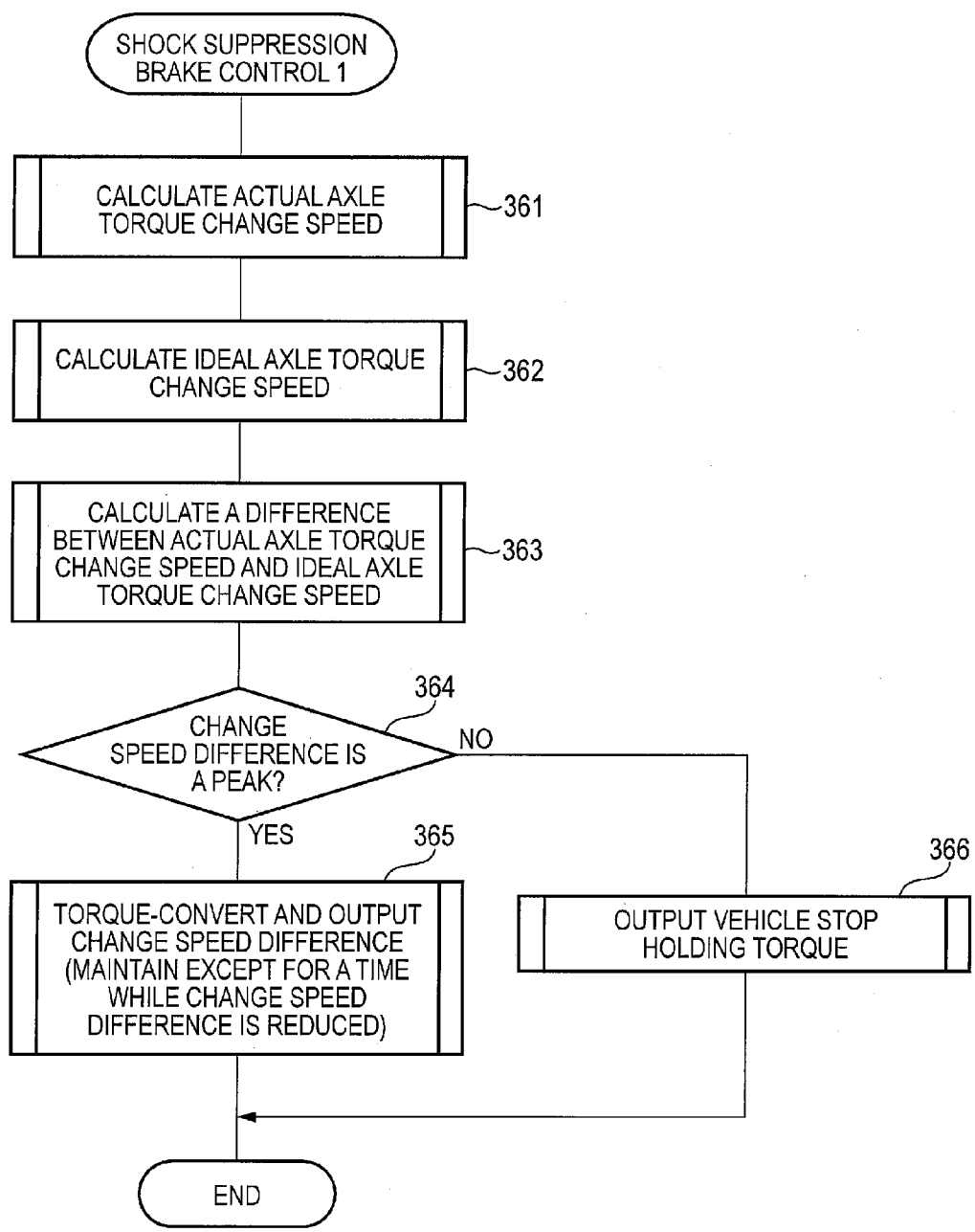
FIG. 10 is a flowchart showing details of a control process of a pattern 1 of the shock suppression brake control that is executed during the vehicle stop.
Figure 11:
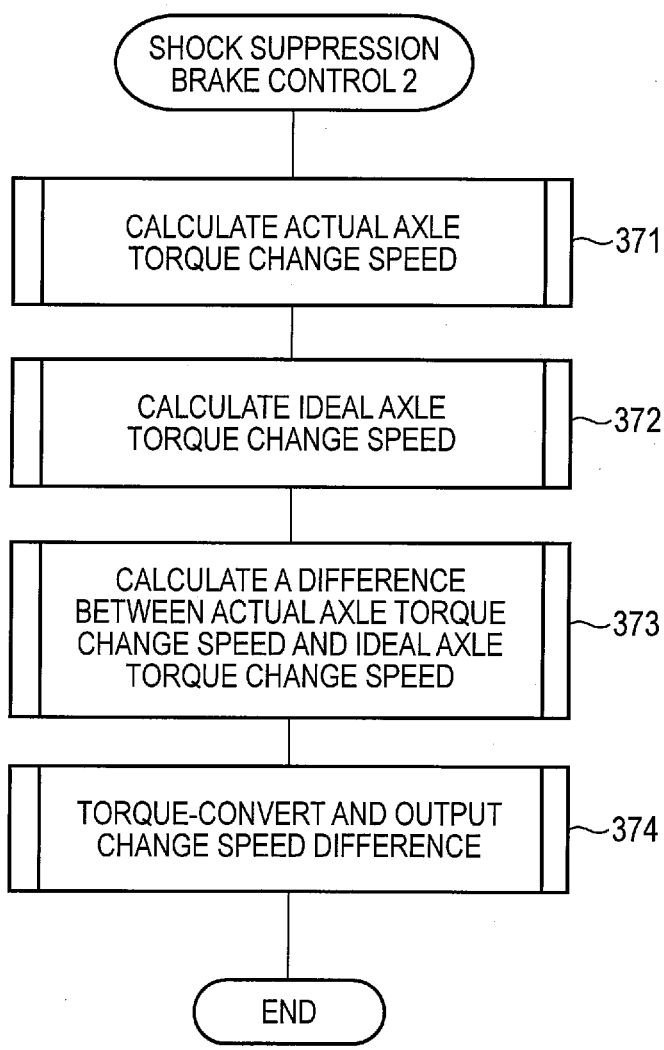
FIG. 11 is a flowchart showing details of a control process of a pattern 2 of the shock suppression brake control that is executed when the vehicle is not stopped.

FIG. 10 is a flowchart showing details of the control process of the pattern 1 of the shock suppression brake control that is executed during the vehicle stop. In addition, FIG. 11 is a flowchart showing details of the control process of the pattern 2 of the shock suppression brake control that is executed when the vehicle is not stopped. The control processes of the respective patterns 1 and 2 of the shock suppression brake control are specifically described with reference to FIGS. 10 and 11.

First, for the pattern 1, in step 361, the engine ECU 20 calculates the actual axle torque change speed. The calculation of the actual axle torque change speed is performed by an actual axle torque change speed calculating process shown in FIG. 12. Specifically, as shown in step 361*a* of FIG. 12, the engine ECU 20 estimates the axle torque change speed, based on a reference model. Here, the reference model is a model that indicates, in a map and the like, a relation between the number of revolutions of the engine, which is obtained by an actual vehicle measurement, and the axle torque change speed including the vibration component of the driving system. Here, by enabling a signal indicating the number of revolutions of the engine to pass through a secondary vibration system filter that is made to be close to the map, the axle torque, which is identified with the number of revolutions of the engine, is obtained and is then differentiated to calculate the axle torque change speed. For example, a lowpass filter, which enables a signal to pass to a frequency band having a predetermined frequency or less, is used as the secondary vibration system filter, so that the axle torque including the vibration component of the driving system is extracted from the signal indicating the number of revolutions of the engine.

In step 362, the engine ECU 20 calculates the ideal axle torque change speed. The calculation of the ideal axle torque change speed is performed by an ideal axle torque change speed calculating process shown in FIG. 13. Specifically, as shown in step 362*a* of FIG. 13, the engine ECU 20 calculates the ideal axle torque change speed, based on a reference model indicating that a response is ideal. Here, the reference model indicating that a response is ideal is a model that indicates, in a map and the like, an ideal relation between the number of revolutions of the engine and the ideal axle torque change speed not including the vibration component of the driving system. According to a result of the measurement, the axle system indicates a resonance of several Hz (for example, about 4 Hz). Hence, since it is possible to obtain the ideal axle torque, which is identified by the number of revolutions of the engine, by using the secondary lowpass filter having a cutoff frequency (for example, about 3 Hz) lower than the resonance frequency of the axle, the engine ECU 20 differentiates the ideal axle torque to calculate the ideal axle torque change speed.

Next, in step 363, the engine ECU 20 calculates a difference (hereinafter, referred to as change speed difference) between the actual axle torque change speed calculated in step 361 and the ideal axle torque change speed calculated in step 362. Then, in step 364, the engine ECU 20 determines whether the change speed difference is a peak. Here, the peak of the change speed difference means that the change speed difference has a maximum value. The determination that the change speed difference is a peak is made when the calculated change speed difference, which is increased every control period, is decreased, or when the change speed difference reaches an predicted peak, so as to predict the peak of the change speed difference at the time of the engine restart, based on change tendency of the ideal axle torque change speed calculated in step 362.

When a result of the determination in step 364 is positive, the engine ECU 20 proceeds to step 365 and torque-converts and outputs the change speed difference. Except for the case where the change speed difference is decreased, the torque that is set at that time is held. On the other hand, when a result of the determination in step 364 is negative, the engine ECU 20 proceeds to step 366 and outputs the vehicle stop holding torque.

For the pattern 2, in steps 371 to 373, the same processes as the steps 361 to 363 of the pattern 1 are executed. In step 374, like the step 365 of the pattern 1, the engine ECU 20 torque-converts and outputs the change speed difference.

FIGS. 14 and 15 show timing charts for illustrating cases where the shock suppression brake controls of the patterns 1 and 2 are respectively executed. In FIGS. 14 and 15, a timing chart of the braking torque is shown when the shock suppression brake control is executed, and timing charts of the number of revolutions of the engine, the axle torque, the axle torque change speed and the axle torque change speed difference are shown when the shock suppression brake control is not executed.

As shown in FIG. 14, since the vehicle is stopped, the vehicle stop holding braking torque (or blow-up torque) is generated from before the engine is restarted. From this state, the engine is restarted at a time point T1 that is an engine restart timing at which the engine restart is requested. Thereby, as the number of revolutions of the engine is increased, a difference between the actual axle torque and the ideal axle torque is generated and a difference (change speed difference) between the actual axle torque change speed and the ideal axle torque change speed is generated. After the change speed difference becomes a peak at a time point T2, the change speed difference is gradually decreased. Therefore, the braking torque that is generated based on the change speed difference is reduced.

When the change speed difference becomes zero at a time point T3, the reduction of the braking torque is ended, and the braking torque that has been generated is maintained up to a time point T4 at which the change speed difference is again generated. During time points T5 to T6, the same operation as the operation that has been made from the time point T3 to the time point T4 is performed, the braking torque is gradually reduced as the change speed difference is decreased, and the braking torque becomes finally zero. That is, by setting the braking torque based on the change speed difference, it is possible to suppress the vibration torque, thereby suppressing the shock of the vehicle.

In addition, as shown in FIG. 15, during a state in which the vehicle is not stopped, since the engine stop is executed in the IS control when the brake operation is performed, the braking torque corresponding to the braking operation is generated. From this state, from a time point T1 to a time point T7, the same operation as FIG. 14 is made. At this time, although the same operation as that in the vehicle stop state is basically performed, since the vehicle stop holding torque (or blow-up torque) that has been set beforehand is not generated, the braking torque corresponding to the change speed difference is generated even from the time point T1 to the time point T2. In the meantime, since it is supposed here that the braking torque corresponding to the brake operation is generated, the braking torque corresponding to the change speed difference is generated with being added to the braking torque corresponding to the brake operation.

As described above, in the engine automatic stop and restart control apparatus of this illustrative embodiment, when restarting the engine, the shock suppression brake control is performed and the braking torque is generated in accordance with the change speed difference, which is a difference between the actual axle torque change speed and the ideal axle torque change speed. Thereby, it is possible to suppress the vibration torque, which is generated when restarting the engine, thereby suppressing the shock of the vehicle.

Other Illustrative Embodiments

In the above illustrative embodiment, the blow-up torque is considered and when the vehicle stop holding torque is smaller than the blow-up torque, the blow-up torque is generated as the braking torque. In other words, when performing the shock suppression brake control, in blowing up the number of revolutions of the engine, the braking torque, which is greater than the blow-up torque that is generated at that time, is generated and then the braking torque is reduced based on the change speed difference. Regarding this, the increase in the braking torque may be combined in addition to the reduction of the braking torque. For example, it may be possible that the braking torque to which the blow-up torque is added is beforehand generated, and even when the vehicle stop holding torque is smaller than the blow-up torque, the vehicle stop holding torque is generated and then the braking torque is increased based on the change speed difference in blowing up the number of revolutions of the engine so that the braking torque becomes the braking torque corresponding to the blow-up torque. In addition, even after the braking torque is once reduced, when the change speed is again increased, the braking torque may be correspondingly increased.

Figure 12:
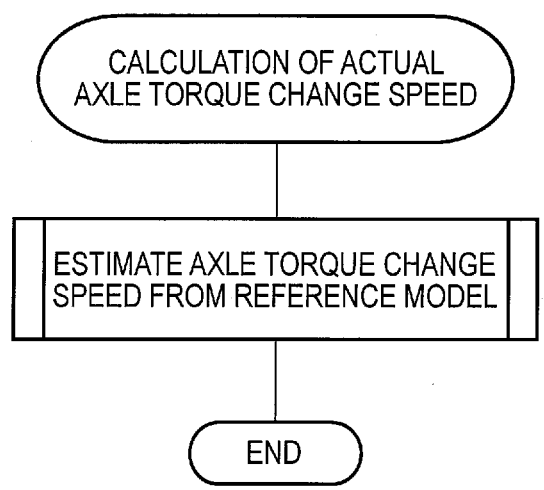
FIG. 12 is a flowchart showing details of an actual axle torque change speed calculating process.
Figure 13:
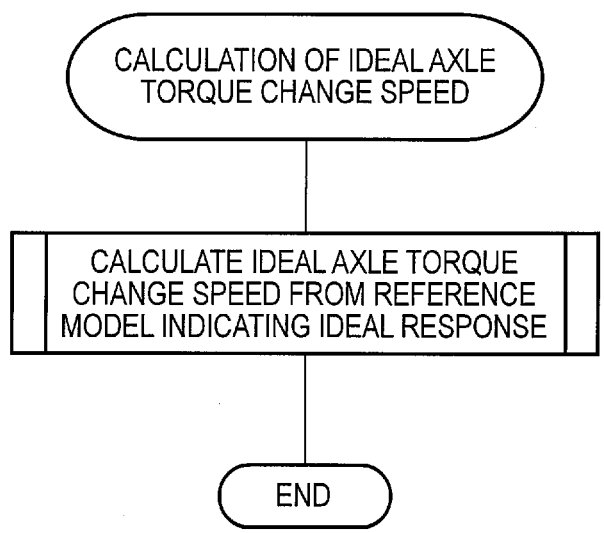
FIG. 13 is a flowchart showing details of an ideal axle torque change speed calculating process.

In the above illustrative embodiment, the reference model is used for the calculation of the actual axle torque change speed shown in FIG. 12 and the calculation of the ideal axle torque change speed shown in FIG. 13, and the second filter close to the reference model is used. However, this is just exemplary. In other words, instead of the filter, a map showing a relation between the number of revolutions of the engine and the actual axle torque change speed or ideal axle torque change speed obtained from the reference model may be used to calculate actual axle torque change speed or ideal axle torque change speed corresponding to the measured number of revolutions of the engine. In addition, instead of the map, a function equation corresponding to the map may be used to calculate actual axle torque change speed or ideal axle torque change speed corresponding to the measured number of revolutions of the engine. Also, regarding the actual axle torque change speed, the axle torque may be actually measured and then the measured value may be used.

In the above illustrative embodiment, the idle stop prohibiting process is executed in the engine stop prohibiting process in step 220 of FIG. 3. However, the idle stop may be directly permitted in the engine stopping process of step 270, depending on the determination results in steps 210 and 230 to 260. Accordingly, for a case where the idle stop is prohibited in the engine stop prohibiting process and then the engine ECU 20 proceeds to the engine stopping process, when the engine ECU 20 counts the elapsed time after it is shifted to the engine stopping process and thus proceeds to the engine stopping process without repeatedly proceeding to the engine stop prohibiting process, the idle stop permission may be executed as the engine stopping process. Like this, by providing the determination time, it is possible to suppress the engine from being unnecessarily stopped during the shifting from the idle stop prohibition to the idle stop permission.

In the meantime, the steps shown in the respective drawings correspond to the means for executing the various processes. For example, the parts executing the processes of steps 100, 200, 300 correspond to the automatic stop and restart control means, the part executing the process of step 262 corresponds to the vehicle stop holding brake control means, the parts executing the processes of steps 361, 371 correspond to the actual axle torque change speed calculation means, the parts executing the processes of steps 362, 372 correspond to the ideal axle torque change speed calculation means, the parts executing the processes of steps 363, 373 correspond to the change speed difference calculation means, the part executing the process of step 364 corresponds to the peak determination means, and the parts executing the processes of steps 365, 366, 374 correspond to the vibration suppression control means. Also, in the above illustrative embodiment, the respective functional parts executing the various processes are divided and provided to the engine ECU 20 and the brake ECU 40. However, the functional parts may be provided to the engine ECU 20 only or all functional parts may be provided to an ECU for IS control that is separately provided from the engine ECU 20. Since various data can be transmitted and received via a LAN for vehicle, the respective functional parts may be dispersed and provided to a plurality of ECUs.

What is claimed is:

1. An engine automatic stop and restart control apparatus comprising:
   an automatic stop and restart control unit which stops and restarts an engine that is a driving source of a vehicle;
   an actual axle torque change speed calculation unit which calculates change speed in actual axle torque that is actually generated when the engine is restarted;
   an ideal axle torque change speed calculation unit which calculates change speed in ideal axle torque that corresponds to engine torque generated by the engine;
   a change speed difference calculation unit which calculates a change speed difference that is a difference between the change speed in actual axle torque and the change speed in ideal axle torque; and
   a vibration suppression control unit which executes a vibration suppression control for applying braking torque based on the change speed difference.

2. The engine automatic stop and restart control apparatus according to claim 1, further comprising:
   a vehicle stop holding brake control unit which, when the vehicle is in a stop state while the engine is stopped, applies, as braking torque, torque equal to or higher than vehicle stop holding torque for holding the stop state of the vehicle,
   wherein while the change speed difference is decreased, the vibration suppression control unit applies the braking torque based on the change speed difference, instead of the torque equal to or higher than the vehicle stop holding torque, which is applied by the vehicle stop holding brake control unit.

3. The engine automatic stop and restart control apparatus according to claim 2,
   wherein, when the change speed difference is not decreased after applying the braking torque based on the change speed difference, the vibration suppression control unit maintains the braking torque when the decrease in the change speed difference is stopped.

4. The engine automatic stop and restart control apparatus according to claim 2,
   wherein the vehicle stop holding brake control unit compares blow-up torque of the number of revolutions of the engine when restarting the engine and the vehicle stop holding torque, and applies, as the torque equal to or higher than the vehicle stop holding torque, the blow-up torque when the blow-up torque is greater than the vehicle stop holding torque.

5. The engine automatic stop and restart control apparatus according to claim 2, further comprising:
   a peak determination unit which determines whether the change speed difference reaches a peak,
   wherein until the peak determination unit determines that the change speed difference reaches a peak, the vibration suppression control unit applies the torque equal to or higher than the vehicle stop holding torque, and
   wherein after the peak determination unit determines that the change speed difference reaches a peak, while the change speed difference is decreased, the vibration suppression control unit applies the braking torque based on the change speed difference, instead of the torque equal to or higher than the vehicle stop holding torque, which is applied by the vehicle stop holding brake control unit.

* * * * *